United States Patent [19]
Oda et al.

[11] Patent Number: 5,745,224
[45] Date of Patent: Apr. 28, 1998

[54] DISTANCE MEASUREMENT DEVICE

[75] Inventors: Hajime Oda; Takuma Takahashi, both of Yotsukaido, Japan

[73] Assignee: Seiko Precision Inc., Japan

[21] Appl. No.: 535,521

[22] Filed: Sep. 28, 1995

[30] Foreign Application Priority Data

Sep. 28, 1994 [JP] Japan .................................. 6-233276

[51] Int. Cl.⁶ ........................ G01C 3/08; G01S 13/00
[52] U.S. Cl. ..................... 356/4.01; 356/5.03; 342/95; 367/99
[58] Field of Search ................. 356/4.01, 5.03, 356/5.04; 342/90, 95, 27, 135, 136; 367/99

[56] References Cited

U.S. PATENT DOCUMENTS

| | | | |
|---|---|---|---|
| 3,743,419 | 7/1973 | Skagerlund | 356/5 |
| 4,259,592 | 3/1981 | Früngel et al. | 250/574 |
| 4,289,388 | 9/1981 | Wakabayashi et al. | 354/25 |
| 4,777,489 | 10/1988 | Allan | 342/176 |
| 4,854,698 | 8/1989 | Schmidt | 356/5 |
| 4,920,412 | 4/1990 | Gerdt et al. | 358/95 |
| 5,110,203 | 5/1992 | MacCabee | 356/5 |
| 5,243,553 | 9/1993 | Flockencier | 356/5 |
| 5,357,331 | 10/1994 | Flockencier | 356/5 |

FOREIGN PATENT DOCUMENTS

| | | |
|---|---|---|
| 1311337 | 3/1973 | United Kingdom . |
| 2220814 | 1/1990 | United Kingdom . |
| 2247534 | 3/1992 | United Kingdom . |
| 2269461 | 2/1994 | United Kingdom . |
| 1605369 | 6/1994 | United Kingdom . |

OTHER PUBLICATIONS

Patent Abstracts of Japan, vol. 17, No. 387 (P-1576) Jul. 20, 1993.

*Primary Examiner*—Mark Hellner
*Attorney, Agent, or Firm*—Adams & Wilks

[57] ABSTRACT

A distance measurement device comprises at least one switch for generating a start signal, a distance measurement device for measuring the distance to an object in response to the start signal, a memory device for storing distance data measured by the distance measurement device, the stored data defining a plurality of measurement zones within the full range of distance measurement of the distance measurement device, and a judgement circuit for judging which measurement zone the result of the distance measurement performed by the distance measurement means belongs to from the plurality of measurement zones defined by the distance data stored in the memory device. In accordance with this configuration, division points can be set if an object is placed at an actual division point desired and a switch is pressed. Accordingly, when an operator sets the division point, it is unnecessary to depend on memory, perception, or calculation, and the setting of the division points becomes easier. A timer may be used to facilitate the setting of the long distance side division point even in the case of only one operator. In addition, setting circuitry, such as a digital switch, becomes unnecessary, so the construction of the device may be substantially simplified. Moreover, since the division points can be easily set to any distance within the distance measurable range, they can be set with a high degree of accuracy.

7 Claims, 4 Drawing Sheets

DISTANCE MEASUREMENT DEVICE

FIELD OF THE INVENTION

The present invention relates to a distance measurement device which measures a distance to an object by determining which of a plurality of preset measurement zones the measurement result belongs to and which generates a corresponding output.

BACKGROUND INFORMATION

Applicants have proposed a distance measurement device that is capable of determining whether an object is within a specific user-defined measurement zone. In applicants' earlier distance measurement device, the full distance measurement range of the device is divided into a plurality of user-defined measurement zones. The device measures the distance to an object, and a determination is made as to which user-defined measurement zone the measurement corresponds to.

FIG. 4 is a circuit block diagram illustrating the basic structure of applicants' earlier distance measuring device, and FIG. 5 is an explanatory drawing illustrating the setting of user-defined measurement zones and the relationship between division points Pa0 to Pa15, Pb0 to Pb15 and measurement zones Z51, Z52 and Z53.

In FIG. 4, reference numeral 41 denotes distance measurement means for measuring the distance to an object T, and which commences measurement when a start switch SS is activated.

Reference numerals 43 and 44 denote first division point setting means for setting a division point on a long distance side, Pan, and second division point setting means for setting a division point on a short distance side, Pbm, respectively, as shown in FIG 5. Here, m and n are both integers between 0 and 15. When the full range of distance measurement of the distance measurement means is divided into measurement zones Z51, Z52 and Z53, as shown in FIG. 5(c), a division point on the long distance side, Pan, and a division point on the short distance side, Pbm, can be set by the user with the first and second division point setting means 43, 44 operating independently from each other. A construction having 16 possible fixed division points for each division point setting means (Pa0 to Pa15 and Pb0 to Pb15) can be achieved with combinations of output voltage levels on four-bit outputs for each of the two division point setting means.

Assuming that the distance measurement range of the distance measurement means 41 is between 0.5 m and 3.7 m, then in the foregoing example the distance measurement range will be divided into 16 equal regions and therefore the respective division points will move by 0.2 m each time a respective division point setting means is moved one step. If the division point Pan is set to Pa8, the distance from the distance measurement device to Pa8 will be 0.5+8×0.2=2.1 m. Similarly, if the division point Pbm is set to Pb3, the distance from the distance measurement device to Pb3 will be 0.5+3×0.2=1.1 m.

Judgement means 42 judges in which of the set measurement zones Z51 to Z53 the distance measurement result of the distance measurement means 41 is located, and outputs the result of the judgement to output terminals 45a, 45b and 45c.

In the above-described distance measurement device, the first and second division point setting means must be manually set to a position equivalent to each distance value for the setting of each division point, so the operator of the device must remember the distance value that each step of the division point setting means is equivalent to. In addition, calculations must be made one by one, as shown above, and therefore setting is difficult to perform. Further, in order for the above-described measurement zones to be properly set, manual measurement of the distance to an object in the actual field where this distance measurement device is used is necessary.

For example, when the distance measurement device is to be used as a switch for an illuminator which is to be on only when a human body is within a predetermined range from the device, in order to set the distance measurement device it is necessary for a person to stand at a position where the distance measurement device is actually operated. The distance between the distance measurement device and the person is then measured, for example, using a measuring tape, and the respective division point setting means are then set so that the distance measurement device can perform a desired operation at that position. Further, since the 16 division points have been fixed in advance, the distance resolution is constant. Therefore, in order to set a finer distance, the number of bits of the setting means must be increased to increase the resolution. By doing this, the circuit complexity will be increased as will the cost.

SUMMARY OF THE INVENTION

It is therefore an object of the present invention to provide a distance measurement device where the above-described calculations are unnecessary, and wherein division points can be easily set and the resolution can be varied.

In order to achieve the above-described objects and others, in one aspect of the present invention a distance measurement device comprises at least one switch for generating a start signal, distance measurement means for measuring a distance to an object in response to the start signal, storage means for storing distance data measured by the distance measurement means, and judgement means for judging which measurement zone the result of the distance measurement of the distance measurement means belongs to from the plurality of measurement zones defined by the distance data stored in the storage means.

In accordance with another aspect of the present invention, the distance measurement device comprises at least one switch for generating a start signal, a timer for outputting a timeout signal a predetermined period of time after generation of the start signal, distance measurement means for measuring a distance to an object in response to the timeout signal, storage means for storing distance data measured by the distance measurement means, and judgement means for measuring which measurement zone the result of the distance measurement of the distance measurement means belongs to from a plurality of measurement zones defined by the distance data stored in the storage means.

DETAILED DESCRIPTION OF THE PREFERRED EMBODIMENTS

The present invention will hereinafter be described in detail in accordance with embodiments shown in the accompanying drawings.

Figure 1:
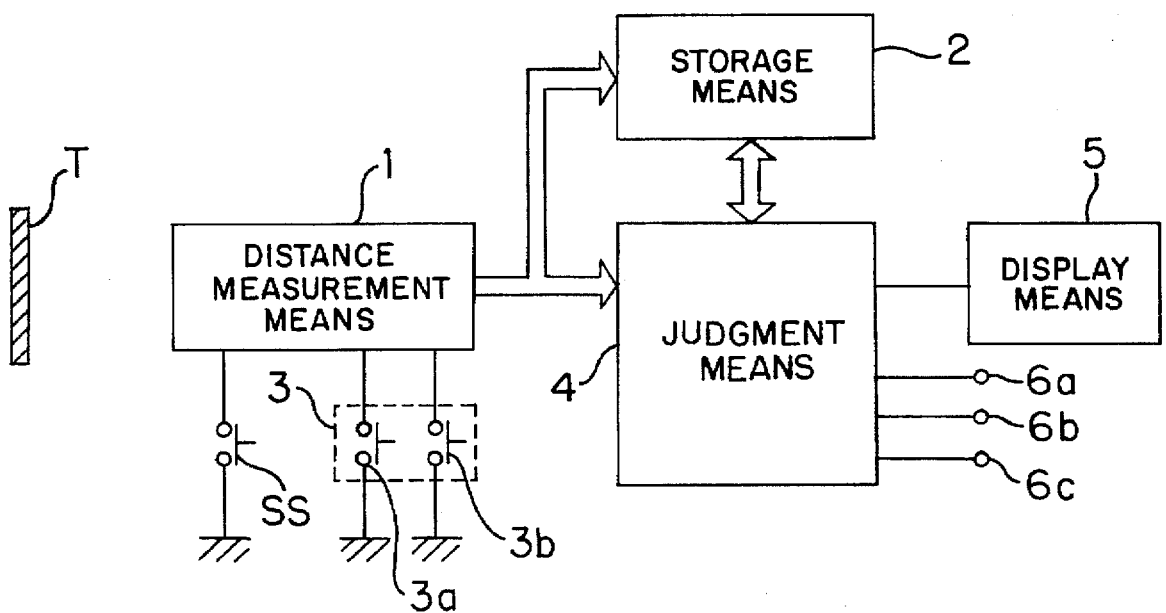
FIG. 1 is a circuit block diagram showing the construction of distance measurement device in accordance with a first embodiment of the present invention.
Figure 2:
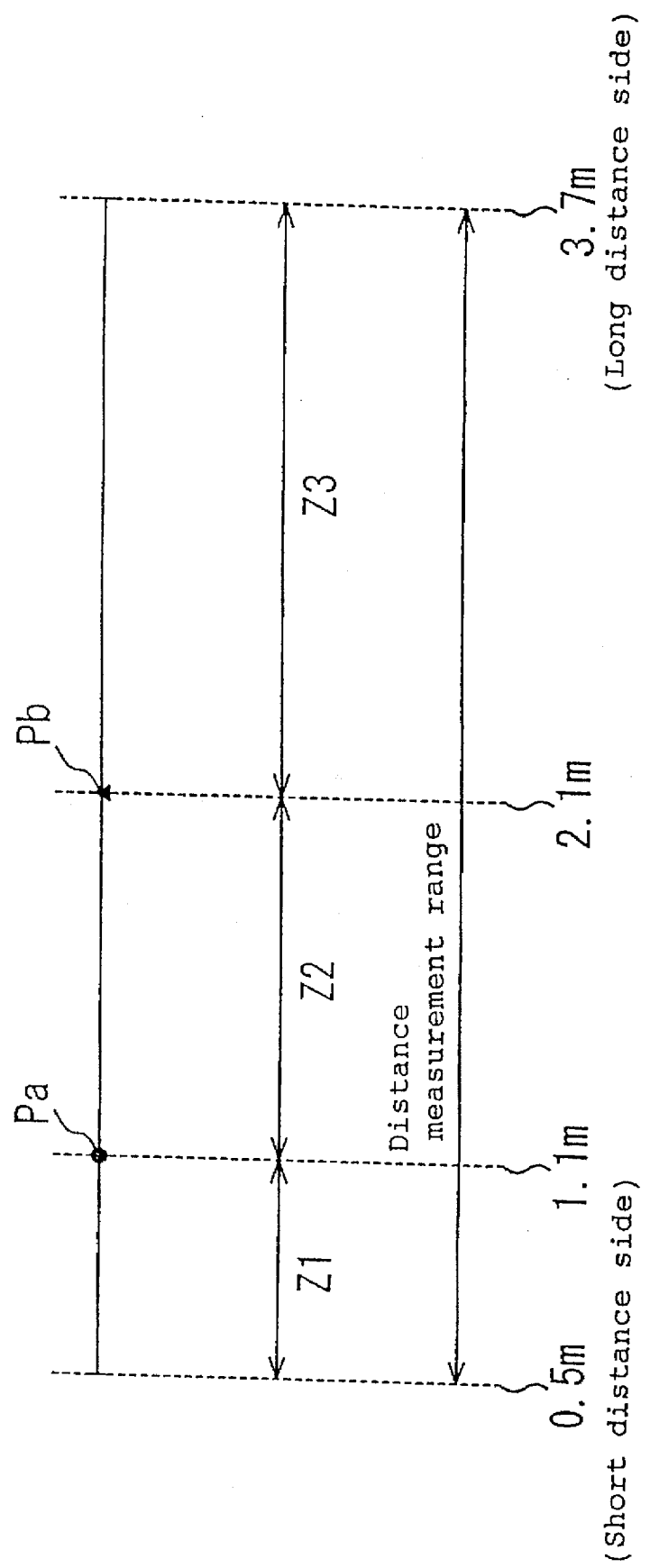
FIG. 2 is an explanatory diagram illustrating operation of the first embodiment of the present invention.
Figure 4:
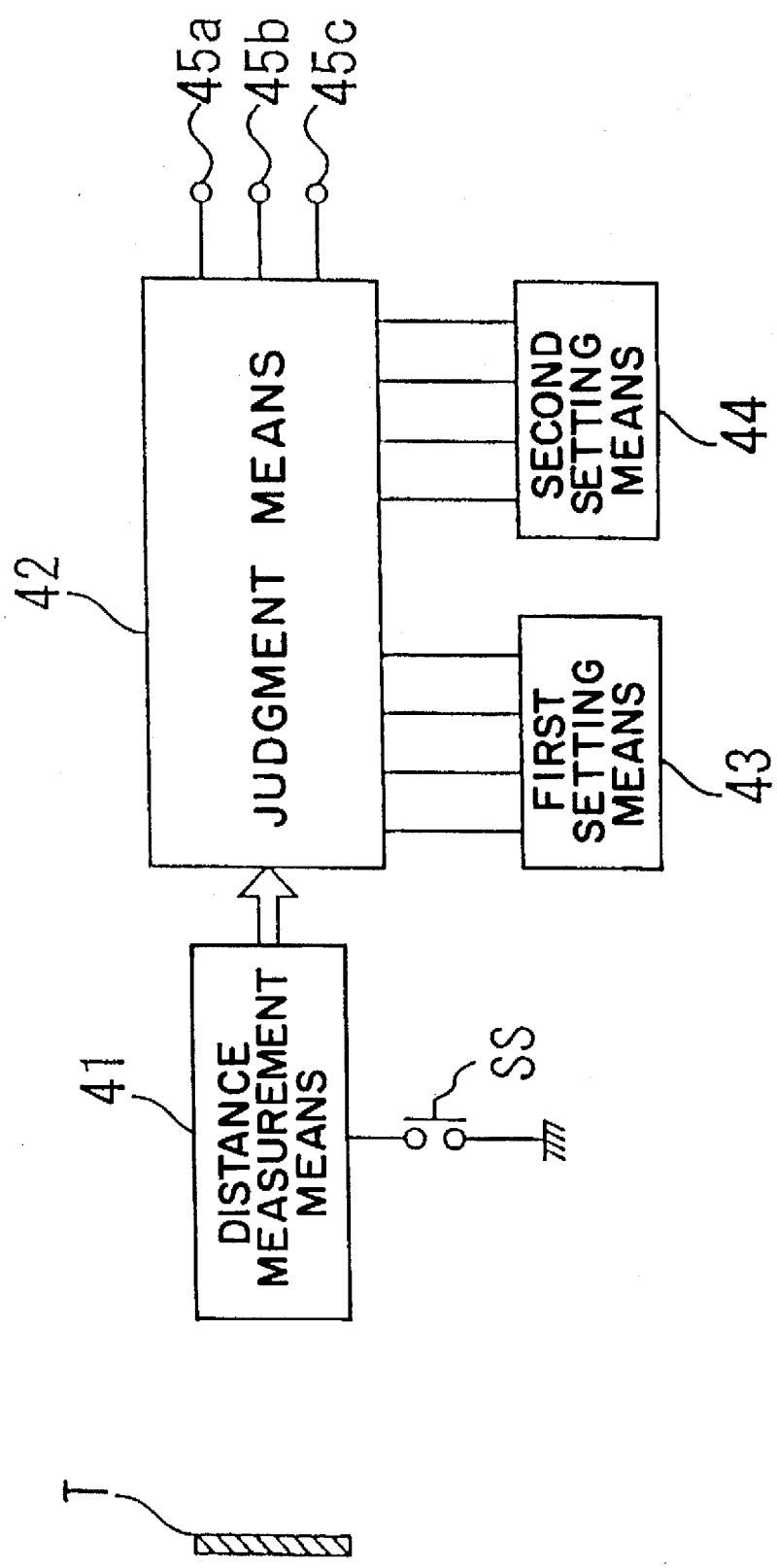
FIG. 4 is a circuit block diagram showing the construction of applicants' prior distance measurement device.
Figure 5:
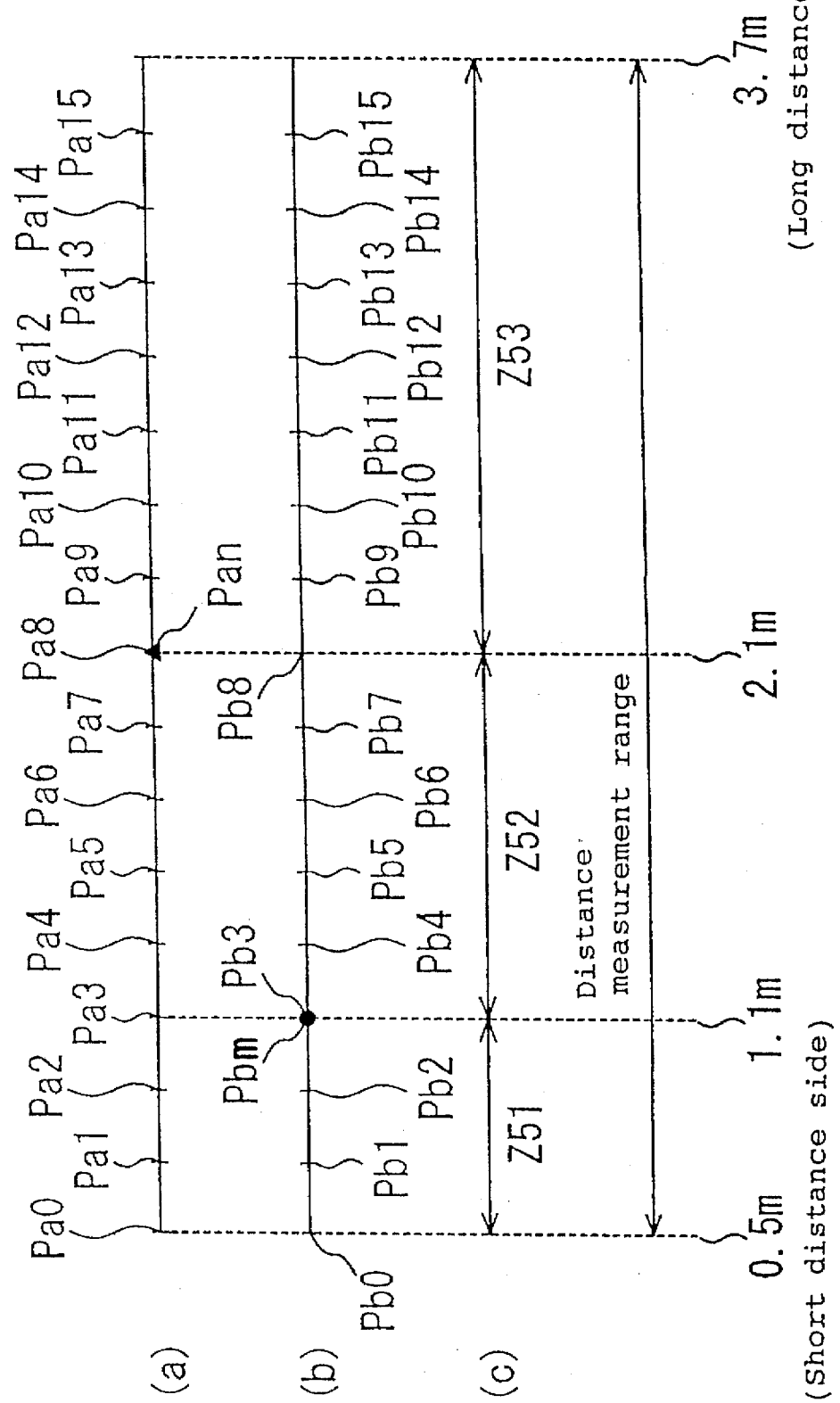
FIG. 5 is an explanatory diagram illustrating operation of the distance measurement device of FIG. 4.

FIG. 1 is a circuit block diagram showing the construction of a distance measurement device according to a first embodiment of the present invention. For ease of discussion, there is shown a case wherein the full measurable range of the device is divided into three measurement zones, Z1, Z2 and Z3 with two distance division points Pa and Pb. This relationship is shown in FIG. 2.

Reference numeral 1 denotes distance measurement means for measuring a distance to an object T. The distance measurement means 1 may comprise, for example, means for emitting infrared light and detecting light reflected from the object T with a position sensitive diode (PSD), or means using ultrasonic waves for distance measurement. The distance measurement means 1 has switches 3a and 3b for setting two distance division points and a start switch SS for starting a normal distance measurement operation. The switch 3a is used for setting a division point on a long distance side, Pa, and the switch 3b is used for setting a division point on a short distance side, Pb. The switches 3a and 3b constitute the setting means 3.

Storage means 2 stores distance information data corresponding to the short distance side and long distance side division points obtained by the operation of the switches 3a and 3b. Judgement means 4 judges which measurement zone the distance measurement result of the distance measurement means 1 belongs to, from the plurality of measurement zones defined by the plurality of division points stored as distance information data in the storage means 2. Display means 5 displays that the distance data of the division points have been stored in the storage means 2. Output terminals 6a, 6b and 6c constitute output means for outputting information corresponding to the measurement zone in which the object is located.

Next, the operation of the first embodiment of the present invention is described.

First, when the long distance side division point Pa is set, the operator or user places an object at a position away from the distance measurement device by a desired distance and presses the switch 3a. The distance measurement means 1 performs a distance measurement operation, measures the distance to the object, and stores the distance data DPa (in this case, 2.1 m) in the storage means 2. At this time, the display means 5 displays that the distance data of the long distance side division point has been stored for a predetermined period of time. Next, in order to set the short distance side division point Pb, the operator first places the object at a position away from but closer than in the first case to the distance measurement device and then presses the switch 3b. In the same way in which the long distance side division point is obtained, the distance measurement means 1 performs a distance measurement operation, measures the distance to the object, and stores the distance data DPb (in this case, 1.1 m) in the storage means 2. The display means 5 displays that the distance data of the short distance side division point has been stored in the storage means for a predetermined period of time.

If the start switch SS is thereafter pressed, the distance measurement means 1 will perform a normal distance measurement operation. Various methods for performing the distance measurement operation are possible. For example, a single distance measurement operation may be performed each time the start switch SS is pressed, or distance measurement operations may be performed at predetermined intervals (for example, at intervals of 0.5 seconds) during the period of time that the start switch SS is pressed.

When the distance measurement operation ends, the judgement means 4 will compare the distance data DPx with the distance data DPa and DPb stored in the storage means 2. Among the three measurement zones Z1, Z2, and Z3 defined by the two division points Pa and Pb, the judgement means 4 determines which of the measurement zones the distance data DPx belongs to, and outputs the result of the determination to the output terminals 6a, 6b, and 6c. As shown in FIG. 2, measurement zone Z1 covers a distance more than 0.5 m and less than Pb, the measurement zone Z2 covers a distance more than Pb and less than Pa, and the measurement zone Z3 covers a distance more than Pa.

When it is assumed that the value DPa of the division point Pa is 2.1 m and the value DPb of the division point Pb is 1.1 m, the distance measurement result will be within the measurement zone Z1 if it has a value, for example, of 0.9 m. In this case, only the terminal 6a is made high (hereinafter referred to as "H"), and terminals 6b and 6c are made low (hereinafter referred to as "L"). Likewise, if the distance measurement result is 1.5 m and within the measurement zone Z2, then only the terminal 6b will be set to "H". If the distance measurement result is 2.8 m and within the measurement zone Z3, then only the terminal 6c will be set to "H".

In the manner described above, the division points can easily be set. There are, however, some applications in which the distance measurement device is fixed or difficult to move, or where there is no appropriate object available which may be used for the setting of the division points. In such a case, the division point may be set by using the operator's hand, but in the case of one operator, the set distance will be limited to the reach of the operator's hand. While the setting means 3 can be operated by remote control, such a construction would increase the complexity and the cost of the device. A second embodiment of the present invention for solving this problem will thus be described.

Figure 3:
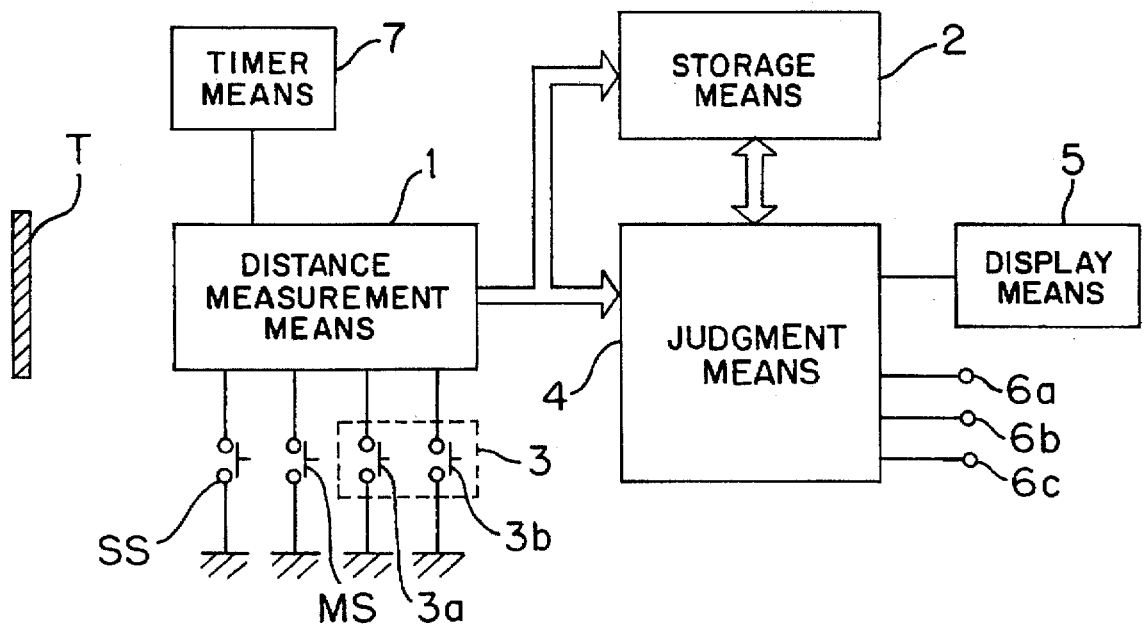
FIG. 3 is a circuit block diagram showing the construction of a second embodiment of the present invention.

FIG. 3 is a circuit block diagram of the second embodiment of the present invention. In the drawing, elements of the second embodiment having the same reference numbers as elements in FIG. 1 represent the same parts. In FIG. 3, timer means 7 starts timing from the time that the switch 3a or 3b is pressed, and outputs a timeout signal after a predetermined period of time. Also, the distance measurement means 1 is provided with a mode switch MS for enabling or disabling the operation of the timer means 7. When the mode switch is off, the operation of the FIG. 3 circuit is the same as that of the first embodiment.

If the switch 3a or 3b of the setting means 3 is pressed when the mode switch MS is on, then the timer means 7 will start its operation and the display means 5 will inform the operator that the timer means 7 is being operated. The timeout signal is generated, for example, in 10 seconds. The display means 5 lights for the first 7 seconds of the period of time that the timer means operates, and is turned on and off for the remaining 3 seconds. Using this display mode, the operator is informed that timeout is approaching. The distance measurement means 1 is in its standby state until the timeout signal is generated by the timer means 7 and does not perform the distance measurement operation. The operator moves to a desired position during the 10 seconds that the timer means 7 is operating, and stops at that position.

When the timer means 7 outputs a timeout signal after ten seconds, the distance measurement means 1 will start the distance measurement operation and measure the distance to the operator. The distance data is stored in the storage means 2. As will be appreciated, by use of a timer, division points can be set without difficulty even when there is only one operator.

While it has been described in accordance with the first and second embodiments that the full measurement range of the distance measurement means is divided at two distance division points into three measurement zones, the invention is not limited to the this scheme. (k+1) measurement zones (where k is an integer more than 3) can also be set with k division points. For example, four measurement zones can be set with three division point setting means.

Also, while it has been described in connection with the first and second embodiments that the operation of setting the division points is started when the switch 3a or the switch 3b of the setting means 3 is pressed, lock means may also be provided since the setting of the division points is not often performed. Thus, division points may be set only when the lock switch is off, and previously set division points would not be erased even if the switches 3a or 3b were pressed by mistake. Alternatively, the switches 3a or 3b could be adapted to function only when pressed for a predetermined period of time.

Furthermore, only one switch may be provided for the setting means 3, and the division points to be set may be alternated each time the switch is pressed.

Moreover, in the first and second embodiments, in order to inform the operator that distance data has been stored in storage means after the distance measurement, the display means 5 may be lit with a different pattern from that generated during a normal distance measurement, or additional display means may be lit for a predetermined period of time.

In accordance with the present invention, a division point can be set if an object is placed at an actual desired distance and a switch is pressed. Accordingly, when an operator sets the division point in the field, it becomes unnecessary to depend on memory, perception, or calculations, and the setting of the division point becomes easier.

In addition, since the second embodiment includes timer means, the setting of the division points is possible even by only one operator.

In accordance with the present invention, digital switch means becomes unnecessary, so the device can be easily constructed at low cost. Moreover, since the division points can be set to any distance within the distance measurable range, they can be set with a higher degree of accuracy.

We claim:

1. A device for determining the distance range of an object, comprising: distance measurement means for measuring a distance to an object; storage means for storing at least one distance measurement result obtained by the distance measurement means during a division point setting operation, the at least one stored distance measurement result serving as at least one division point for dividing an effective measurement range of the distance measurement means into a plurality of measurement zones; and judging means for judging which of the plurality of measurement zones a distance measurement result obtained by the distance measurement means during a distance measurement operation other than a division point setting operation belongs to.

2. A device for determining a distance range of an object according to claim 1; further comprising output means for outputting a signal in accordance with an output of the judging means.

3. A device for determining a distance range of an object according to claim 1; further comprising division point setting means for controlling the distance measurement means to perform a division point setting operation to set at least one division point.

4. A device for determining a distance range of an object according to claim 3; wherein the division point setting means comprises a first division point setting means for setting at least one first division point and a second division point setting means for setting at least one second division point.

5. A device for determining a distance range of an object according to claim 3; wherein the first and second division point setting means each comprise a switch for generating a signal for controlling the distance measurement means to measure a distance to an object and controlling the storage means to store the measured distance.

6. A device for determining a distance range of an object, comprising: distance measurement means for measuring a distance to an object; at least one switch for generating a start signal to start a division point setting operation; a timer for counting time in response to the start signal and for generating a timeout signal a predetermined time after generation of the start signal; storage means for storing at least one distance measurement result obtained by the distance measurement means in response to the timeout signal during a division point setting operation, the at least one stored distance measurement result serving as at least one division point for dividing an effective measurement range of the distance measurement means into a plurality of measurement zones; and judging means for judging which of the plurality of measurement zones a distance measurement result obtained by the distance measurement means during a distance measurement operation other than a division point setting operation belongs to.

7. A device for determining a distance range of an object according to claim 6; further comprising output means for outputting a signal in accordance with an output of the judging means.

* * * * *